United States Patent [19]
Fye

[11] Patent Number: 5,983,024
[45] Date of Patent: Nov. 9, 1999

[54] METHOD AND APPARATUS FOR ROBUST DATA BROADCAST ON A PERIPHERAL COMPONENT INTERCONNECT BUS

[75] Inventor: James Calvin Fye, Scottsdale, Ariz.

[73] Assignee: Honeywell, Inc., Minneapolis, Minn.

[21] Appl. No.: 08/978,777

[22] Filed: Nov. 26, 1997

[51] Int. Cl.$^6$ ........................................... G06F 13/00
[52] U.S. Cl. ..................... 395/856; 395/287; 395/290; 395/304; 395/306; 711/146
[58] Field of Search ................... 395/842–865, 395/726–732, 287–308; 711/146

[56] References Cited

U.S. PATENT DOCUMENTS

| | | | |
|---|---|---|---|
| 5,506,971 | 4/1996 | Giullette et al. | 395/296 |
| 5,594,882 | 1/1997 | Bell | 711/212 |
| 5,623,645 | 4/1997 | Yip et al. | 395/551 |
| 5,634,138 | 5/1997 | Ananthan et al. | 395/841 |
| 5,680,643 | 10/1997 | Flynn | 395/855 |
| 5,724,528 | 3/1998 | Kulik et al. | 395/308 |
| 5,761,454 | 6/1998 | Adusumilli et al. | 395/306 |
| 5,771,387 | 6/1998 | Young et al. | 395/733 |
| 5,781,748 | 7/1998 | Santos et al. | 395/308 |
| 5,802,323 | 9/1998 | Bujanos et al. | 395/287 |
| 5,802,324 | 9/1998 | Wunderlich et al. | 395/281 |
| 5,802,577 | 9/1998 | Bhat et al. | 711/146 |
| 5,813,036 | 9/1998 | Ghosh et al. | 711/146 |
| 5,835,741 | 11/1998 | Elkhoury et al. | 395/309 |
| 5,838,932 | 11/1998 | Alzien | 395/308 |
| 5,838,993 | 11/1998 | Riley et al. | 395/842 |

*Primary Examiner*—Christopher B. Shin
*Attorney, Agent, or Firm*—Snell & Wilmer L.L.P.

[57] ABSTRACT

A method of robust data broadcasting on a peripheral component interconnect(PCI) bus sets intended target agents to snoop the broadcast transaction in which the master agent also responds as the target agent.

8 Claims, 2 Drawing Sheets

| Doubleword | Byte 3 | Byte 2 | Byte 1 | Byte 0 |
|---|---|---|---|---|
| | Device ID | | Vendor ID | |
| | Status Register | | Command Register | |
| | Class Code | | | Revision ID |
| | BIST | Header Type | Latency Timer | Cache Line Size |
| | Base Address 0 | | | |
| | Base Address 1 | | | |
| | Base Address 2 | | | |
| | Base Address 3 | | | |
| | Base Address 4 | | | |
| | Base Address 5 | | | |
| | CardBus CIS Pointer | | | |
| | Subsystem ID | | Subsystem Vendor ID | |
| | Expansion ROM Base Address | | | |
| | Reserved | | | |
| | Reserved | | | |
| | Max_Lat | Min_Gnt | Interrupt Pin | Interrupt Line |

CONFIGURATION SPACE HEADER

Fig. 2

METHOD AND APPARATUS FOR ROBUST DATA BROADCAST ON A PERIPHERAL COMPONENT INTERCONNECT BUS

BACKGROUND OF INVENTION

The present invention relates generally to bus protocols and more specifically to a method for robust broadcasting on a Peripheral Component Interconnect(PCI) bus or the like.

Data broadcasting mechanisms are a proven and effective way to distribute data within high performance computing environments. The Peripheral Component Interconnect (PCI) bus is such an environment. PCI has become an industry standard low cost high performance bus architecture and is used in numerous computing environments.

A deficiency of the current PCI specification (Revision 2.1) is that it lacks a "robust" data broadcasting methodology. Generally, a robust data broadcasting methodology includes attributes such as explicit identification (e.g. addressing) of data packets, and high speed delivery of data packets with minimal delays and inefficiencies.

The PCI specification does implement a "simple" message broadcast mechanism via the Special Cycle transaction. The Special Cycle transaction can be used to communicate processor status or in general any logical sideband signaling required between PCI agents. PCI sideband signaling is defined as communication that occurs between two or more PCI agents that occurs outside the normal transfers supported by the PCI specification and only has meaning between those agents.

The Special Cycle transaction allows the PCI system designer a method of achieving sideband(even limited broadcast) communication without requiring additional signal pins. However, the Special Cycle transaction has several limitations. Some of the limitations are:

- No explicit destination address(i.e. the address phase contains no valid information)
- The first data phase is required to be a 16 bit encoded message field and an optional 16 bit data field(i.e. useless fields)
- Only three message encodings are defined in the PCI specification, all other messages encodings are reserved. Additional message encodings must be obtained from the PCI Special Interest Group(SIG) Steering Committee.
- The Special Cycle transaction is required to be "slow" to allow target agents sufficient time to process the broadcasted request. The master agent is required to guarantee that the current access will not complete for at least four clocks after the last valid data phase.

As can be seen, the currently defined "simple" (i.e. Special Cycle) broadcast mechanism as defined per the PCI specification is not adequate to support the desired attributes for robust data broadcasting.

Computer systems requiring high speed data delivery would benefit by a method to allow a robust broadcast mechanism on a PCI bus without the need for additional sideband signaling pins.

SUMMARY OF THE INVENTION

The invention provides a method and apparatus for robust data broadcasting on a PCI bus. The invention configures intended target agents to snoop a broadcast transaction which the master agent transmits and also responds to as the transaction's target agent.

During normal PCI bus transfers when a single master agent and a single target agent communicate, the attributes discussed above for robust data occur. The PCI bus also allows for data snooping of transactions for agents on the same PCI bus segment. By taking advantage of these attributes of the PCI bus, the invention creates a robust data broadcasting mechanism which is overlaid onto a conventional PCI bus while retaining full PCI protocol compatibility.

The invention is implemented as follows. First, a master agent, which will transmit the data, is configured to 1)transmit the data on the PCI bus, and 2)positively respond as the target agent. This causes the data to be put onto the PCI bus at high speed and with full compliance with PCI protocols. Next, all of the intended target agents are designed to snoop the PCI broadcast transaction. When a broadcast transaction of interest is detected, the target agent immediately begins to receive the data.

The physical address assignment on a PCI bus segment according to the current invention would look as follows:

The standard mapping of the PCI bus' three physical address spaces(Memory, I/O, and Configuration) are available unaltered.

In addition, some of the above unused PCI physical address space is allocated to master(s) and target(s) as the "master-self-responds-as-target, agents-set-to-snoop" physical address space to support the robust data broadcasting transaction of the invention.

Of course, as required with any snooping PCI agent, the snooping agent must operate independently from the current master and target. This implies that the snooping agent must be capable of accepting the transaction at whatever speed the current master and target(or self responding master in this case) are communicating.

A good description of the PCI bus is contained in the PCI Specification Revision 2.1, by the PCI Special Interest Group, 2575 NE Kathryn St. #17, Hillsboro, Oreg. 97124, dated Jun. 1, 1995 and is hereby incorporated by reference.

Another reference is PCI System Architecture, Third Edition, authored by Tom Shanley and Don Anderson, and published by Addison Wesley and is also hereby incorporated by reference.

Therefore, the object of the invention is to provide improved high speed robust data broadcasting on a PCI compliant bus.

A feature of the invention is a master agent which transmits the data and then also positively responds as the target agent.

Another feature of the invention is a target agent configured to snoop the data broadcast.

An advantage of the invention is high speed data delivery of data packets.

Another advantage of the invention is improved functionality for a PCI bus.

The significant features of the invention are illustrated in the figures and described more fully below.

BRIEF DESCRIPTION OF THE DRAWINGS

FIG. 2 is a target agent configuration space head.

DETAILED DESCRIPTION

Figure 1:
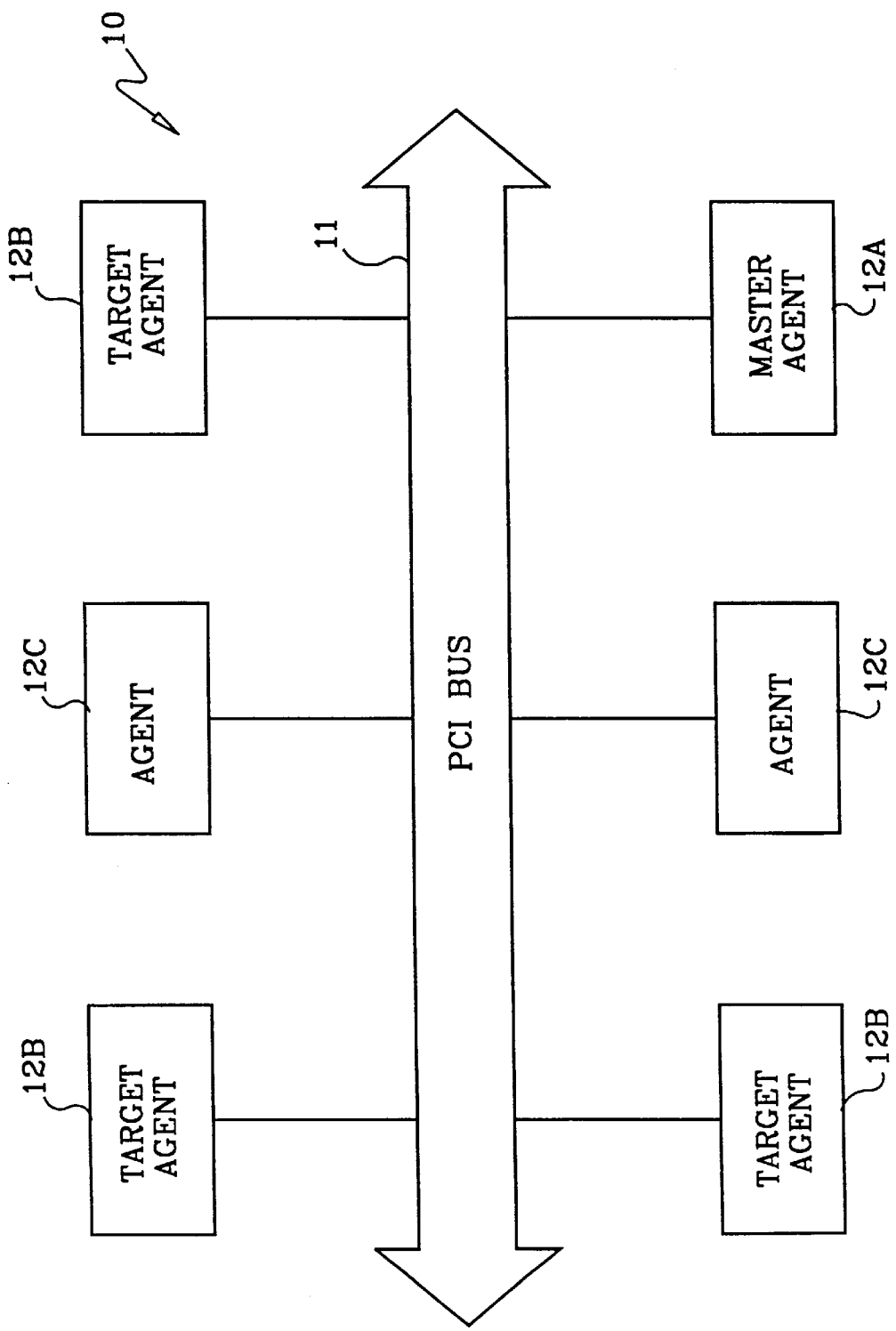
FIG. 1 is a block diagram of the invention.

FIG. 1 is a block diagram of a PCI bus system according to the invention. Shown in FIG. 1 are PCI bus system 10, PCI bus 11, and agents 12. Agents include master agent 12A, target agents 12B and non-target agents 12C.

PCI bus 11 is any conventional PCI specification compliant bus. Non-target agents 12C are agents which are not involved with the broadcast transaction. The non-target agents 12C are included to illustrate that conventional PCI agents will function on the PCI bus 11 and are compatible with the broadcast transaction of the invention.

Master agent 12A is the agent which performs the data broadcast on the PCI bus 11. Master agent(or just master) 12A must perform several steps. First, the master 12A must gain access to the PCI bus 11 via the arbitrator in the conventional manner. Next, the master 12A must transmit the data block on the PCI bus 11. The master 12A must assert the FRAME# signal, the IRDY#(initiator ready) signal, and the address and data lines in the conventional manner for a write command.

Since the invention requires the master 12A to also positively respond as the target, the master 12A must also assert the TRDY#(target ready) signal in the same manner as a conventional target.

Implicit in this transaction is the fact that the master 12A transmits the proper address associated with the data broadcast so that the target agents(or just targets) 12B can correctly identify the data broadcast on the PCI bus 11.

The preferred embodiment uses the write command to transmit data on the bus 11. However, those skilled in the art recognize that other commands such as memory write and invalidate or configuration write could also be used.

Target agents 12B(or just targets) are the intended recipients of the data broadcast. Targets 12B are configured to "snoop" the data broadcast and must be capable of processing the data at the maximum speed at which the data will be transmitted by the master 12A. This is the case since the targets 12B are merely snooping the data and have no way to initiate a wait state.

The preferred embodiment accomplishes target snooping by configuring an alternate base address in the target's configuration space header with the physical address associated with the data broadcast. When the target 12B detects the data broadcast address on the PCI bus 11, the target begins to process the data broadcast. Of course, the target 12B follows conventional PCI protocols and checks that signals such as IRDY# and TRDY# are properly set.

Although the invention is intended to be compatible with conventional PCI, implementation of the invention may not be possible with many conventional off the shelf commercial PCI chip sets. Therefore, the preferred embodiment uses custom devices such as FPGA's(field programmable gate arrays) and ASIC(application specific integrated circuits) to implement the customized PCI bus interface. This is required primarily because commercial chip sets are unlikely to support the snoop mode. Most commercial chip sets will not support a snoop mode where signals such as DEVSEL# and TRDY# are not asserted by the target.

FIG. 2 illustrates a target's configuration space header according to the invention. Header 20 is formatted as a conventional PCI header. Base address 0 shown in header 20 is typically loaded with the physical address assigned to the target agent by the PCI BIOS during initialization. When other PCI agents communicate with the target they use this physical address. The target agent is responsive to this physical address and monitors the PCI bus 11 for any occurrence of the physical address in base address 0. In this capacity, the target is functioning in one-to-one communications.

An important aspect of the configuration space header relating to the invention is the difference in functionality when a second base address(e.g. base address 1) is loaded. In a conventional PCI agent the multiple base addresses provide separate physical addresses for multiple functions in an agent. The agent is responsive to any occurrence of the physical addresses stored in the base addresses. This includes asserting signals such as DEVSEL# and TRDY# in a conventional manner.

In the invention a target 12B functions differently. When a second base address is loaded in the target 12B, target 12B snoops the broadcast data and does not assert any signals such as DEVSEL# or TRDY#.

Similarly, a base address in the master's configuration space header is loaded with the physical address associated with the data broadcast. Thus the master responds to a data broadcast as the target. This accomplishes the master-self-responds-as-target mentioned above.

Those skilled in the art will see many alternate embodiments of the invention. For example, there may be several distinct data broadcasts on a single PCI bus segment. Each distinct data broadcast being associated with a distinct physical address. Also, several different agents may be configured to function as masters for a data broadcast transaction. Similarly, a master for one distinct data broadcast may also be a target for another distinct data broadcast.

This description has been for descriptive purposes only and is not intended to limit the scope of the invention. Those skilled in the art will recognize numerous alternate embodiments of the invention which deviate from the described embodiment but still perform the same work in substantially the same way to achieve substantially the same result and are therefore equivalent to the invention.

It is clear from the foregoing that the present invention represents a new and useful method and apparatus for allowing a robust data broadcasting on a PCI bus.

The embodiments of an invention in which an exclusive property or right is claimed are defined as follows:

1. A method of robust data broadcastng on a Penrpheral Component Interconnect (PCI) bus for communicating a data block from a master agent to a plurality of target agents, the method comprising the steps of:

(a) configuring said master agent to respond as a target agent during a non-special cycle broadcast transaction through control of control lines previously dedicated to said plurality of target agents;

(b) configuring said plurality of target agents to cease control of said previously dedicated control lines and snoop the data block during said non-special cycle broadcast transaction;

(c) performing said non-special cycle broadcast transaction by said master agent; and (d) receiving said data block by said plurality of target agents configured to snoop in step (b).

2. The method of claim 1, further comprising the step of configuring said master agent to snoop the data block during said non-special cycle broadcast transaction.

3. The method of claim 1, further comprising the step of configuring a non-target agent such that said non-target agent is not responsive to said non-special cycle broadcast transaction.

4. The method of claim 1, further comprising the step of configuring a plurality of non-target agents such that said plurality of non-target agents are not responsive to said non-special cycle broadcast transaction.

5. The method of claim 1, wherein step (b) includes configuring an alternate base address in a configuration space header with a physical address associated with said non-special cycle broadcast transaction.

6. The method of claim 5, wherein step (b) includes processing said base transaction when an alternate base address in a configuration space header with a physical address associated with said broadcast transaction is detected by one of said plurality of target agents.

7. The method of claim 1, wherein step (a) includes asserting a target ready signal.

8. The method of claim 1, wherein step (a) includes transsmitting an address associated with the data block for correct identification on the PCI bus.

* * * * *